US012769951B2

(12) United States Patent
Sundar et al.

(10) Patent No.: US 12,769,951 B2
(45) Date of Patent: Oct. 20, 2026

(54) SYSTEM AND METHOD FOR GENERATING DYNAMIC CONVERSATIONAL AI EXPERIENCES USING LARGE LANGUAGE MODELS AND DECISIONING SYSTEMS

(71) Applicant: VERIZON PATENT AND LICENSING INC., Basking Ridge, NJ (US)

(72) Inventors: Shyam Sundar, Tamil Nadu (IN); Aiswarya Venkatachalapathy, Tamil Nadu (IN); Aravind Kumar Palani, Tamil Nadu (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 267 days.

(21) Appl. No.: 18/644,436

(22) Filed: Apr. 24, 2024

(65) Prior Publication Data

US 2025/0335713 A1 Oct. 30, 2025

(51) Int. Cl.
*G06F 17/00* (2019.01)
*G06F 40/30* (2020.01)

(52) U.S. Cl.
CPC .................................... *G06F 40/30* (2020.01)

(58) Field of Classification Search
None
See application file for complete search history.

(56) References Cited

U.S. PATENT DOCUMENTS

| | | | | |
|---|---|---|---|---|
| 10,817,670 | B2 * | 10/2020 | Galitsky | G06F 40/30 |
| 12,125,059 | B2 * | 10/2024 | Wright | G06N 3/044 |
| 2024/0070434 | A1 * | 2/2024 | Garg | G06F 16/3344 |
| 2024/0303496 | A1 * | 9/2024 | Nair | G06N 3/0895 |
| 2025/0238968 | A1 * | 7/2025 | Ibrahim | G06T 11/00 |
| 2025/0245670 | A1 * | 7/2025 | Kanagovi | G06Q 30/015 |

* cited by examiner

*Primary Examiner* — Satwant K Singh

(57) ABSTRACT

In some implementations, the techniques described herein relate to a method including: receiving a natural language question from a user; determining, using a large language model, whether the natural language question is a transactional question or an informational question; generating, using a first generative artificial intelligence (AI) model, a first response to the natural language question when the natural language question is an informational question; generating, using a transaction generative AI model, a second response to the natural language question when the natural language question is a transactional question; generating, using a sentiment-based response generator, a third response based on one of the first response or the second response and a sentiment of the natural language question; and presenting the third response to the user.

20 Claims, 12 Drawing Sheets

SYSTEM AND METHOD FOR GENERATING DYNAMIC CONVERSATIONAL AI EXPERIENCES USING LARGE LANGUAGE MODELS AND DECISIONING SYSTEMS

BACKGROUND

Conversational artificial intelligence (AI) systems, such as chatbots, have become increasingly popular for providing automated customer support and enabling user interactions with various services. These systems typically rely on predefined conversational flows, natural language processing (NLP) engines, and manual configuration to understand user intents and provide appropriate responses. However, the manual effort required to set up and maintain such systems can be significant, leading to slow development cycles and limited flexibility in adapting to changing user needs.

DETAILED DESCRIPTION

The disclosed techniques relate to a conversational AI system that can process natural language questions from users and provide appropriate responses based on the type of question and the sentiment of the user. The system can use a large language model (LLM) to determine whether a question is transactional or informational in nature. For informational questions, the system can generate a response using a generative AI model that retrieves relevant information from document and web data sources and synthesizes a response based on the retrieved information and customer-specific data. For transactional questions, the system can generate a response using a transaction-specific generative AI model that processes the question, extracts relevant entities, incorporates flow-specific prompts and persona instructions, and validates the response using semantic and syntactic parsers.

The generative AI models used in the system can include an embedding layer for converting input text into dense vector representations, transformer encoders with multi-head attention mechanisms and feed-forward networks for processing the embeddings, and an output embedding layer for mapping the generated response back to the original text space.

Regardless of the type of question, the system can also employ a sentiment-based response generator to create a more empathetic and context-aware response. This generator can take the initial response and the sentiment of the user's question as inputs, and uses a empathy-driven NLG model to generate a new response that aligns with the user's emotional state. The new response can then be validated for syntactic correctness and semantic coherence before being presented to the user.

To continuously improve the performance of the transaction-specific generative AI model, the system can use a combination of supervised learning and reinforcement learning approaches. The system can access a knowledge base containing chat logs, transcripts, and transaction records, and can use this data to train the model. The reinforcement learning approach can include generating model prompts, setting goals for a learning agent, determining actions to achieve those goals, assessing the agent's performance, and updating its behavior based on feedback and rewards.

The disclosed techniques can be implemented as a method, a non-transitory computer-readable storage medium storing computer program instructions, or a device with a processor and a storage medium storing program logic for execution by the processor.

Figure 1:
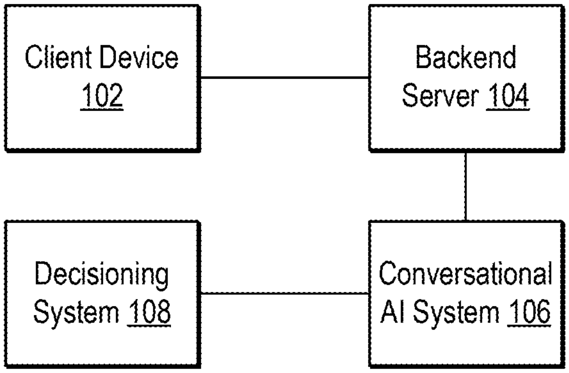
FIG. 1 is a block diagram illustrating a conversational AI system according to some of the disclosed embodiments.

FIG. 1 is a block diagram illustrating a conversational AI system according to some of the disclosed embodiments.

In the illustrated embodiment, a client device (102) is communicatively coupled to a backend server (104). In some implementations, client device (102) can submit input to the backend server (104). For example, a website or mobile app may provide a chat interface allowing client device (102) to input natural language questions. In some implementations, backend server (104) can receive these questions over a network and associate the questions with a user account before forwarding them to the conversational AI system (106), described next.

In some implementations, the client device (102) can be a computer, smartphone, tablet, or any other electronic device capable of running a client application, such as a web browser or a mobile app. The client application can provide a user interface that allows users to interact with the conversational AI system (106) by inputting natural language queries, questions, or commands.

In one implementation, the backend server (104) can be a web server that hosts the client application and facilitates communication between the client device (102) and the conversational AI system (106). The backend server (104) can receive the natural language input from the client device (102) over a network, such as the Internet, using various communication protocols like HTTP, HTTPS, or WebSocket.

In some implementations, the backend server (104) can perform additional tasks before forwarding the user input to the conversational AI system (106). For example, the backend server (104) can authenticate the user, validate the input, or associate the input with a specific user account or session. This allows the conversational AI system (106) to provide personalized responses based on the user's context and previous interactions.

In another implementation, the backend server (104) can include additional components or services that enhance the functionality of the conversational AI system (106). For instance, it can include a user profile database that stores user preferences, history, and other relevant information. It can also include a context management service that maintains the conversation context across multiple user interactions, allowing for more coherent and contextually relevant responses.

In various implementations, conversational AI system (106) may include various sub-systems (described in later figures) to support generative AI or LLM-based approaches to simulating chat sessions without involving operators. Generally, conversational AI system (106) will receive a natural language input and any client-related details and formulate a chat-based response to the input. Details of the subsystems used to perform this general operation are described in detail herein.

In various implementations, the conversational AI system (106) may include several subsystems that work together to generate-like responses to user queries without requiring intervention. These subsystems leverage advanced techniques such as generative AI, LLMs), sentiment analysis, reinforcement learning, and knowledge retrieval from various data sources.

One component of the conversational AI system (106) is the LLM-based conversation engine. This engine uses language models to understand the user's intent and generate contextually relevant responses. The LLM is trained on vast amounts of conversational data, allowing it to understand communication and provide coherent and engaging responses.

To enhance the user experience, the conversational AI system (106) can incorporate sentiment analysis capabilities. By analyzing the emotional tone of the user's input, the system can adapt its responses to show empathy, provide support, or de-escalate potentially frustrating situations. This enables more natural and human-like conversations that can improve user satisfaction and engagement.

Another aspect of the conversational AI system (106) is its ability to handle both transactional and informational user requests. For transactional queries, the system integrates with backend decisioning systems (e.g., decisioning system 108) to execute complex business processes and provide dynamic, personalized responses based on the user's specific context and needs. For informational queries, the system leverages knowledge retrieval techniques to extract relevant information from structured and unstructured data sources, such as databases, documents, and web pages, to provide accurate and up-to-date answers to user questions.

To continuously improve its performance, the conversational AI system (106) can employ reinforcement learning techniques. By analyzing user feedback, conversation outcomes, and other metrics, the system can fine-tune its language models, conversation strategies, and decision-making processes. This iterative learning approach allows the system to adapt to changing user preferences, optimize its responses for specific domains or use cases, and deliver increasingly sophisticated and effective conversational experiences over time.

Details of these operations are described in further detail in the following figures.

As illustrated, conversational AI system (106) can retrieve data from a decisioning system (108). Conversational AI system (106) is designed to integrate with decisioning system (108) to enable complex transactional capabilities. By leveraging the decisioning system's interfacing contracts, conversational AI system (106) can understand and execute a wide range of transactions, such as bill payments, device sales, account modifications, and more. This integration allows conversational AI system (106) to utilize the decisioning system's established business rules, workflows, and decision models to ensure accurate and compliant transaction processing. In some implementations, the coupling between conversational AI system (106) and decisioning system (108) significantly streamlines the chatbot development lifecycle. Specifically, developers can focus on defining the conversational flows and behaviors while relying on the decisioning system to handle complex business logic and transactional processing. This approach reduces development effort, improves efficiency, and ensures consistency across different conversational scenarios. Moreover, the modular architecture of conversational AI system (106) allows for easy updates and enhancements to the chatbot's capabilities without disrupting the underlying decisioning system. Furthermore, conversational AI system (106) provides a flexible framework for defining custom conversational behaviors and prompts, enabling organizations to tailor the user experience to their specific needs and requirements.

In some implementations, the decisioning system (108) can be a comprehensive business rules management system (BRMS) or a business process management (BPM) platform. These systems enable organizations to define, execute, and manage complex business logic and workflows that drive business processes and decision-making. In some implementations, decisioning system (108) acts as the backbone of conversational AI system (106), providing a framework for defining and executing transactional flows and business rules. Decision system (108) can encapsulate an organization's domain-specific knowledge, policies, and procedures, making them accessible to conversational AI system (106) through well-defined interfaces and contracts.

In some implementations, decisioning system (108) allows business users and subject matter experts to define and manage business rules using a user-friendly interface, with, for example, a domain-specific language (DSL) or decision tables. These rules can govern various aspects of the conversational flow, such as eligibility criteria, pricing, discounts, and approvals. Decisioning system (108) can ensure that conversational AI system (106) adheres to the organization's business policies and regulations while providing personalized and context-aware responses to user queries.

In some implementations, decisioning system (108) can also enable the orchestration and automation of complex business processes. It can allow organizations to model, execute, and monitor end-to-end processes that span multiple systems and departments. In some implementations, decisioning system (108) can provide a visual interface for designing process flows, defining task assignments, and specifying decision points. By integrating with decisioning system (108), the conversational AI system (106) can guide users through multi-step transactions, gather necessary information, and trigger downstream processes based on user inputs, as will be discussed.

In some implementations, decisioning system (108) also can be used to manage the state and context of the conversation. For example, it can maintain a record of the user's interactions, preferences, and past transactions, allowing conversational AI system (106) to provide personalized and contextually relevant responses. The decisioning system's ability to handle complex decision logic and maintain conversation state enables the conversational AI system to deliver a seamless and intelligent user experience.

The decisioning system (108) typically includes a set of tools and technologies that allow business users and developers to create, test, and deploy decision models, business rules, and process flows. These components work together to automate and optimize various aspects of an organization's operations, such as customer service, sales, marketing, and fraud detection.

In the context of the conversational AI system (106), the decisioning system (108) can be used to handle transactional user queries. When a user makes a request that involves executing a business process or making a decision based on specific rules and criteria, the conversational AI system (106) can leverage the decisioning system (108) to determine the appropriate course of action. In addition to handling the business logic and decision-making, decisioning system (108) can also support automating the creation of conversation flows within the conversational AI platform. Traditionally, building conversation flows in existing conversation systems requires manual effort, which can be time-consuming and prone to errors. However, by integrating with decisioning system (108), the conversational AI system (106) can automatically generate conversation flows based on the defined business processes and decision models. Decisioning system (108) can provide a structured representation of the conversation flow, including intents, entities, and actions, which can be seamlessly mapped to the corresponding elements in a conversation AI system. This automation significantly reduces the development effort and allows for rapid deployment and updates of the conversational AI system.

For example, if a user asks the conversational AI system (106) to upgrade their mobile phone plan, the system can interact with the decisioning system (108) to first retrieve the user's current plan details and account information, then evaluate the user's eligibility for an upgrade based on predefined business rules (e.g., contract status, payment history, credit score), then determine the available upgrade options and their associated costs and benefits, then calculate any applicable discounts or promotions based on the user's profile and the company's marketing strategies, and finally generate a personalized recommendation for the user based on their needs and preferences. This transaction flow can be stored in the decisioning system (108) in any suitable format.

The conversational AI system (106) can then use this information and these decisions provided by the decisioning system (108) to construct a natural language response that guides the user through the upgrade process, explains the available options, and helps them make an informed decision.

By integrating with the decisioning system (108), the conversational AI system (106) can handle a wide range of transactional queries and provide dynamic, personalized responses that are tailored to each user's specific context and needs. The integration can allow the conversational AI system to deliver more valuable and effective user experiences while leveraging the organization's existing business logic and processes.

Figure 2:
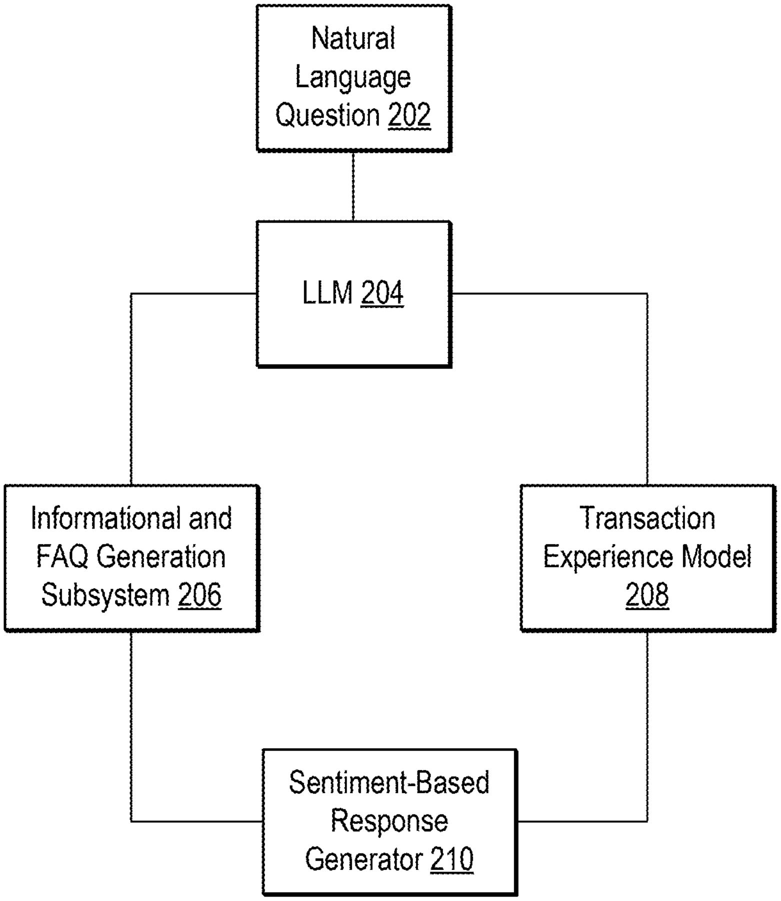
FIG. 2 is a block diagram illustrating a conversational AI system according to some of the disclosed embodiments.

FIG. 2 is a block diagram illustrating a conversational AI system according to some of the disclosed embodiments.

As illustrated, the conversational AI system receives a natural language question (202) from the user. In response, the sub-system can determine whether the natural language question is a transactional question or an informational question. In some implementations, a large language model (LLM) (204) can be used to make this determination. If the natural language question (202) is an informational query, the sub-system can pass the natural language question to an informational and frequently asked question (FAQ) response generation subsystem (206) (discussed in FIG. 5) which generates a response. Alternatively, if the natural language question (202) is a transactional question involving data from a decisioning system, the sub-system can pass the natural language question (202) to a transaction experience model (208) (described in FIG. 4) which also generates a response. For any response generated by the models, the sub-system can pass the response and the natural language question (202) into a sentiment-based response generator (210) which can modify the response based on the sentiment of the natural language question (202) and/or the session in which the natural language question (202) appears.

In the illustrated conversational AI system, the LLM (204) can determine the nature of the user's natural language question (202). The LLM (204) can be trained to classify the user's question as either transactional or informational.

When a user submits a natural language question (202), the LLM (204) can analyze the content and context of the question to determine its type. It can use its learned knowledge and understanding of language patterns to identify key characteristics and intent behind the user's query. For example, if the question involves specific actions or requests related to a user's account, such as "How do I change my payment method?" or "Can I upgrade my subscription plan?", the LLM (204) may classify it as a transactional question. On the other hand, if the question seeks general information or knowledge, such as "What are the benefits of subscribing to the premium plan?" or "How do I reset my password?", the LLM (204) would classify it as an informational question.

Figure 5:
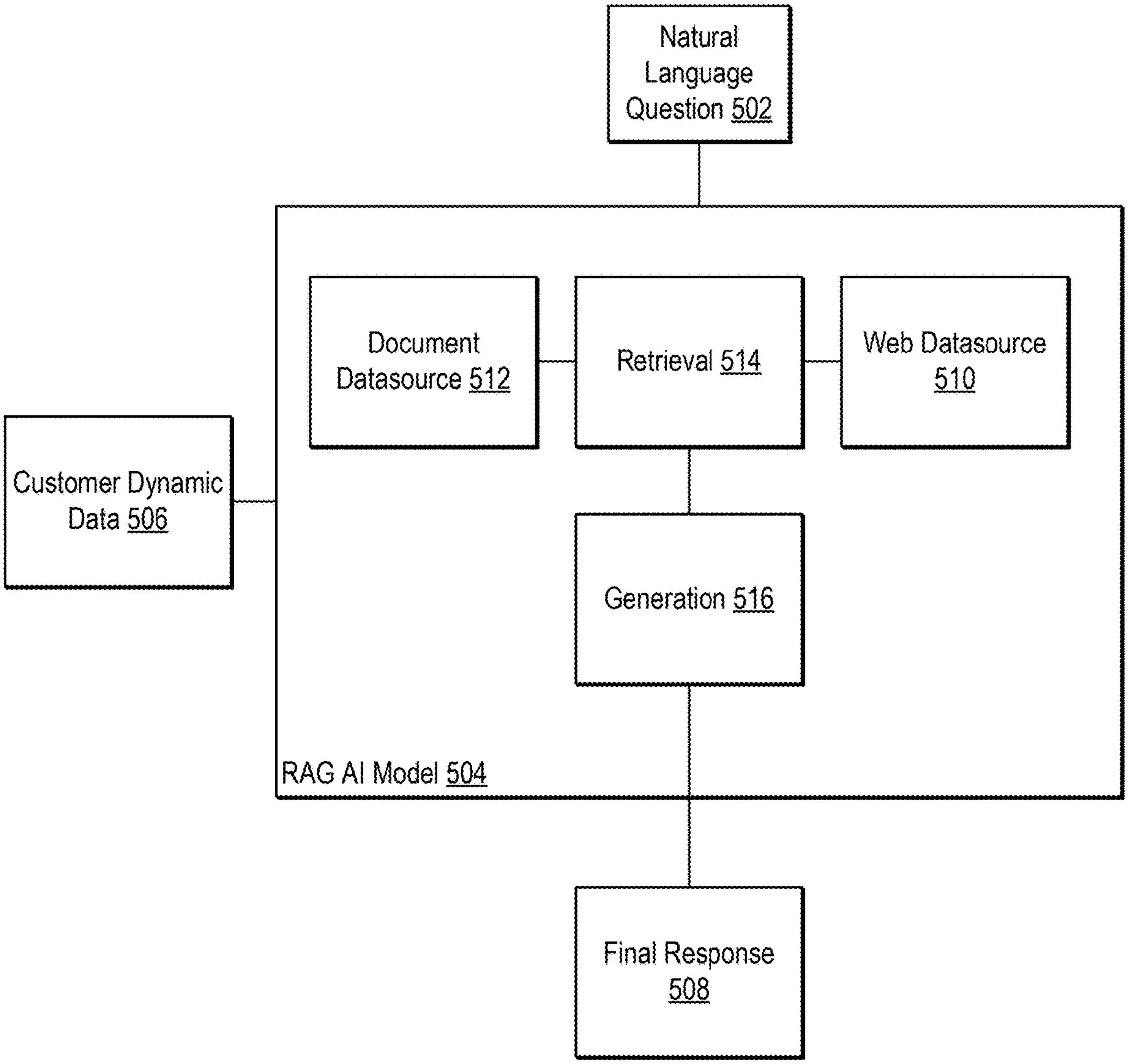
FIG. 5 is a block diagram illustrating an informational and frequently asked question (FAQ) response generation subsystem according to some of the disclosed embodiments.

If the LLM (204) determines that the natural language question (202) is an informational query, it routes the question to the informational and FAQ response generation subsystem (206). This subsystem, as described in detail in FIG. 5, is specifically designed to handle non-transactional questions that can be answered using static content or knowledge bases as well as user-specific context. It employs techniques such as retrieval-augmented generation and information retrieval to find the most relevant information from various data sources, including documents, web pages, and FAQs. The subsystem then generates a concise and accurate response to the user's question based on the retrieved information.

Figure 4:
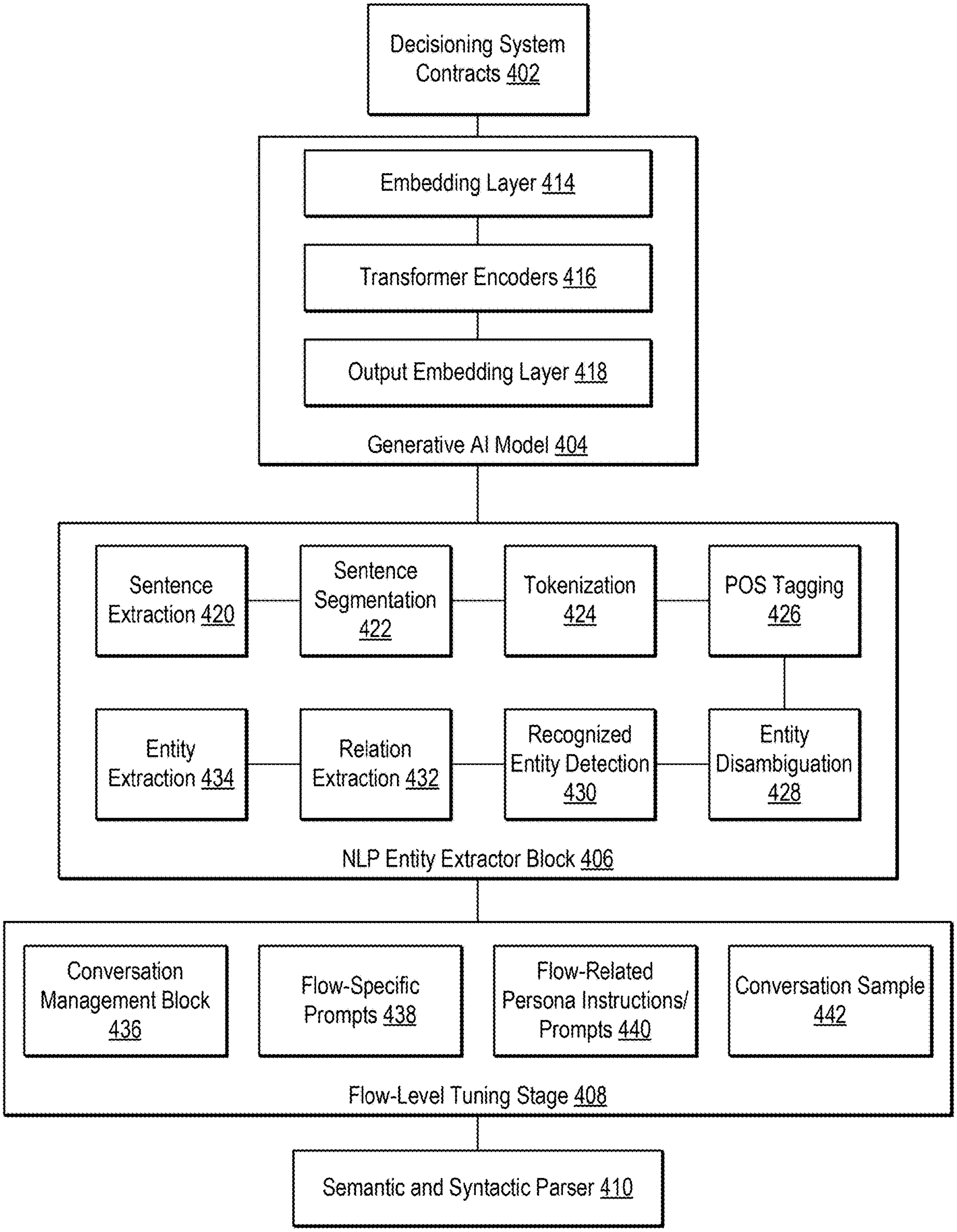
FIG. 4 is a block diagram illustrating a transaction experience model according to some of the disclosed embodiments.

On the other hand, if the LLM (204) classifies the natural language question (202) as a transactional question, it can direct the question to the transaction experience model (208). This model, as described in FIG. 4, is designed to handle questions that involve specific actions or transactions within the system. It can use a decisioning system to access user-specific data and business rules to generate personalized and context-aware responses. The transaction experience model (208) can use techniques such as entity extraction, dialog management, and language generation to understand the user's intent, gather necessary information, and provide a tailored response that guides the user through the transactional process.

Regardless of the type of question and the subsystem it is routed to, the generated response can then be passed through the sentiment-based response generator (210) along with the natural language question (202). This generator, as described in FIG. 3, analyzes the sentiment expressed in the user's question and the overall tone of the conversation session. It can use sentiment analysis techniques to determine whether the user's sentiment is positive, negative, or neutral.

Based on the detected sentiment, the sentiment-based response generator (210) can modify the generated response to better align with the user's emotional state and provide a more empathetic and appropriate response. For example, if the user's question expresses frustration or dissatisfaction, the generator can adjust the response to acknowledge the user's feelings, offer assistance, and provide a more supportive tone. This helps to create a more human-like and engaging conversation experience, improving user satisfaction and building trust.

The sentiment-based response generator (210) may also consider the context of the entire conversation session to ensure consistency and coherence in its responses. It can take into account the user's previous interactions, the flow of the conversation, and any prior sentiments expressed to generate responses that are contextually relevant and maintain a natural dialog flow.

By integrating the LLM (204) for question classification, the informational and FAQ response generation subsystem (206) for handling informational queries, the transaction experience model (208) for processing transactional requests, and the sentiment-based response generator (210) for providing emotionally intelligent responses, the conversational AI system can effectively understand and respond to a wide range of user questions, provide accurate and personalized information, and maintain a natural and empathetic conversation flow, ultimately enhancing user satisfaction and engagement.

Figure 3:
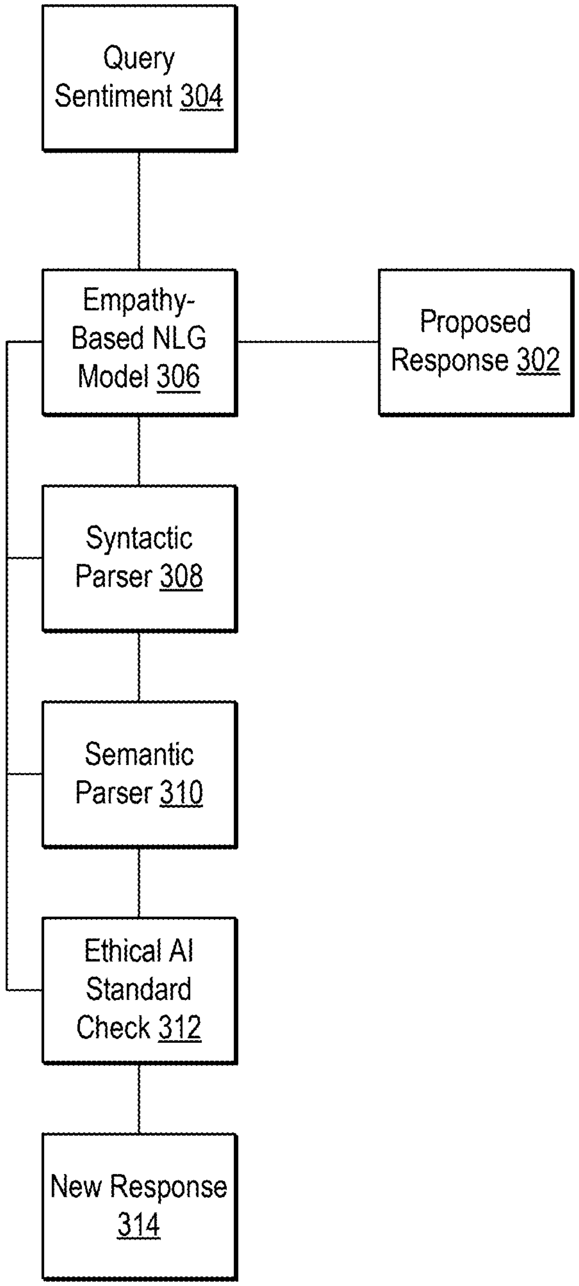
FIG. 3 is a block diagram illustrating a sentiment-based response generator according to some of the disclosed embodiments.

FIG. 3 is a block diagram illustrating a sentiment-based response generator according to some of the disclosed embodiments.

In the illustrated sub-system, a proposed chat response can be manipulated to generate a sentiment-aware response. The illustrated sub-system can be employed at various points in the overall conversational AI system. As one example, LLM-based responses can be fed into the sub-system and converted into an empathetic response as will be discussed.

In the illustrated sub-system, a empathy-driven NLG (natural language generation) model (306) receives, as inputs, a proposed response (302) and a query sentiment (304). In some implementations, the proposed response (302) can comprise one or more of a generic response, a chat response, or other type of response. In some implementations, the proposed response (302) can be retrieved from a dialog management system (not illustrated) which stores responses. In some implementations, the query sentiment (304) can comprise a pre-computed sentiment of a natural language question submitted by a user. In some implementations, this sentiment can be determined using natural language processing (NLP) sentiment analysis routines.

The empathy-driven NLG model (306) generates a new response based on the proposed response (302) and the query sentiment (304). One example of an empathy-driven NLG model is a Markov Chain model, however, other similar types of models may be used including, without limitation, transformer-based models, recurrent neural networks, large-language models, etc. This new response is then validated using a syntactic parser (308) which uses linearization to parse the syntax of the new response. Next, a semantic parser (310) validates the semantic coherency of the new response. If the new response is not semantically valid, another new response is generated via the empathy-driven NLG model (306) and the process repeats. Alternatively, for a semantically valid response, an ethical AI standard check (312) is performed to ensure that the new response is ethical. Again, if not, the empathy-driven NLG Model (306) generates a new response and the process repeats. If, alternatively, the proposed response passes all ethical AI checks, the new response (314) is used as the response. In some implementations, the sub-system can use a maximum number (e.g., two) of iterations through the empathy-driven NLP (306) to attempt to generate a new response. If no valid response is generated in the allocated number of iterations, the subsystem may default to a canned response that is still responsive to the user query but eschews empathetic adjustments.

In some implementations, proposed response (302) is an initial input to the sentiment-based response generator. It can be sourced from various components within the conversational AI system, such as a pre-built dialog management system, a knowledge base, or a language generation model. The proposed response can be used as a starting point for the empathy-driven NLG model (306) to generate a more sentiment-aware response. The content and structure of the proposed response can vary depending on the specific implementation and the nature of the user's query. For example, it could be a simple, generic response template with placeholder variables, or it could be a more sophisticated, context-specific response generated by a language model.

In some implementations, query sentiment (304) is another input to the sentiment-based response generator. In some implementations, query sentiment (304) represents the emotional tone or attitude expressed in a user's natural language question, which can be determined using sentiment analysis techniques. Sentiment analysis is a subfield of NLP that focuses on identifying and extracting subjective information from text, such as opinions, emotions, and attitudes. Various approaches can be used for sentiment analysis, including rule-based methods, machine learning algorithms (e.g., Naive Bayes, Support Vector Machines), and deep learning models (e.g., Recurrent Neural Networks, Transformers). The sentiment information can be represented as a categorical label (e.g., positive, negative, neutral) or a numerical score indicating the intensity and polarity of the sentiment.

In some implementations, empathy-driven NLG model (306) is a probabilistic model that generates sentiment-aware responses based on the proposed response (302) and the query sentiment (304). empathy-driven NLG Model can be used for modeling sequential data, such as text, by capturing the dependencies between adjacent elements in a sequence. In this context, the empathy-driven NLG Model can learn the transition probabilities between words or phrases in a response based on their co-occurrence patterns in a large corpus of conversational data. The model also incorporates the query sentiment information to adjust the response generation process, favoring words and phrases that are more aligned with the desired sentiment. empathy-driven NLG Model (306) can be trained using techniques such as maximum likelihood estimation or Bayesian inference, and the model parameters can be fine-tuned based on user feedback and conversation outcomes.

In some implementations, syntactic parser (308) can analyze the grammatical structure of the generated response and ensuring its syntactic correctness. By using syntactic parsing, the sub-system can determine the hierarchical structure of a response based on a formal grammar. In some implementations, syntactic parser (308) can use linearization techniques to convert the generated response into a linear sequence of words, which can then be parsed using algorithms such as a Cocke-Younger-Kasami (CYK) algorithm or an Earley parser. In some implementations, the syntactic parser (308) can check for agreement between subject and verb, proper use of articles and prepositions, and adherence to the rules of the underlying grammar, among other issues. If the generated response fails the syntactic validation, it is sent back to the empathy-driven NLG Model for regeneration.

In some implementations, semantic parser (310) analyzes the meaning and logical consistency of the generated response. In some implementations, semantic parsing can involve extracting the underlying meaning representation from a natural language utterance, for example, in the form of logical forms or semantic graphs. In some implementations, semantic parser (310) can check whether the generated response is relevant to the user's query, maintains a coherent flow of information, and aligns with the intended message or goal of the conversation. In some implementations, semantic parser (310) may utilize techniques such as named entity recognition, coreference resolution, and semantic role labeling to identify key concepts, entities, and relationships within the response. In some implementations, semantic parser (310) can also incorporate domain-specific knowledge and reasoning capabilities to ensure the response is factually correct and consistent with the conversational context.

In some implementations, ethical AI standard check (312) can ensure the generated response adheres to predefined ethical guidelines and avoids any inappropriate, offensive, or biased content. In some implementations, this check can aid in maintaining the integrity and trustworthiness of the conversational AI system by filtering out responses that may harm or alienate users. The ethical AI standards can encompass various aspects, such as avoiding hate speech, discrimination, profanity, and sensitive topics, as well as promoting fairness, inclusivity, and respect for user privacy. The standards can be implemented as a set of rules, blacklists, or machine learning models trained on annotated data to identify and flag potentially unethical responses. If a response fails the ethical AI check, it is sent back to the empathy-driven NLG Model (306) for regeneration, ensuring that only ethically sound responses are presented to the user.

As illustrated, the above approach can be utilized to transform a canned response into a sentiment-aware response. This approach can be used prior to delivering conversational responses to users based on the outputs of the following models described next.

FIG. 4 is a block diagram illustrating a transaction experience model according to some of the disclosed embodiments.

In the illustrated sub-system, a generative AI model is illustrated. The generative AI model utilizes decisioning system contracts (402) to fine-tune a transformer-based model, such as generative AI model (404) which provides intent resolution and utterance generation. In some implementations, generative AI model (404) can include an embedding layer (414), one or more transformer encoders (416) which each can include a multi-head attention sublayer and feed forward network (FFN), and an output embedding layer (418). The generative AI model (404) can further include an NLP entity extractor block (406). In some implementations, this NLP entity extractor block (406) can receive raw text from a natural language question, perform sentence extraction (420), sentence segmentation (422), tokenization (424), part-of-speech tagging (426), entity disambiguation (428), recognized entity detection (430), relation extraction (432), and entity extraction (434) to identify a set of entities for a given natural language question.

As illustrated, the sub-system can further include a flow-level tuning stage (408). In this flow-level tuning stage (408), the system can receive the output of the generative AI model (404) and NLP entity extractor block (406) and manage a conversation based on the same. To this extent, the flow-level tuning stage (408) includes conversation management block (436) which manages the state of a given conversation with a user and generates prompts for the generative AI model (404). For example, the flow-level tuning stage (408) can utilize the natural language question embedding and entity extractions to populate flow-specific prompts (438) or flow-related persona instructions/prompts (440). Further, flow-level tuning stage (408) can include a conversation sample (442) for referencing during prompting. The output of flow-level tuning stage (408) can be provided to a semantic and syntactic parser (410) which validates the ultimate answer to a natural language question. As discussed, the resulting answer can ultimate be fed into the sentiment-based response generator described previously.

Decisioning system contracts (402) act as an input to the generative AI model (404). These contracts can encapsulate the business logic, rules, and decision-making processes that govern the conversational flow and the actions to be taken based on user inputs. The conversational AI system takes the existing contracts of the decisioning system as input, allowing it to seamlessly integrate with the organization's established business processes and provide a transactional experience without requiring extensive manual configuration. By leveraging these contracts, the conversational AI system can dynamically build conversation flows within platforms like Google® Dialogflow® or other NLP engines. This dynamic flow generation eliminates the need for manual creation of intents, entities, and actions, reducing development effort and enabling rapid deployment of transactional capabilities. The contracts can be expressed in a structured format, such as extensible Markup Language (XML) or JavaScript Object Notation (JSON), and define the input parameters, conditions, and output actions for each decision point in the conversation. These contracts serve as a bridge between the decisioning system and the conversational AI system, allowing for seamless communication and execution of business processes. The generative AI model (404) can interpret these contracts and generate responses that align with the defined business rules and decision-making logic. This ensures that the conversational AI system adheres to the organization's business objectives, complies with regulatory requirements, and provides a consistent and personalized user experience. By leveraging these contracts, the generative AI model (404) can be fine-tuned to generate responses that align with an organization's business objectives, comply with regulatory requirements, and provide a seamless user experience. The decisioning system contracts can be created and managed using specialized tools or platforms, such as BRMSs or decision management suites.

Generative AI model (404) can be trained to understand user intents, generate appropriate responses, and guide the conversational flow. The model architecture can be based on the transformer model, a deep learning model that can be used in various natural language processing tasks, including language understanding, generation, and translation. The transformer architecture can utilize self-attention, which allows the model to weigh the importance of different words or phrases in the input sequence when generating a response.

As illustrated, in some implementations, generative AI model (404) can include various components, although the specific components or number thereof is not limiting.

In some implementations, embedding layer (414) converts the input text, such as natural language questions or system-generated responses, into dense vector representations. These embeddings can capture the semantic meaning of words and phrases, allowing the model to process and reason about the input effectively. Transformer encoders (416) can be the core of the generative AI model (404). In some implementations, each encoder layer can include two or more main sublayers: a multi-head attention mechanism and an FFN. The multi-head attention allows the model to attend to different parts of the input sequence simultaneously, capturing complex relationships and dependencies. The FFN applies non-linear transformations to the attended features, enabling the model to learn high-level representations. The output embedding layer (418) can map the generated response back to the original text space, producing human-readable text that can be presented to the user.

In some implementations, NLP entity extractor block (406) can identify and extract relevant entities from the natural language question. Entities can include names, dates, locations, products, or any other important information that helps in understanding the user's intent and guiding the conversation. The entity extraction process can involve several steps, although the specific components or number thereof is not limiting.

In some implementations, sentence extraction (420) and sentence segmentation (422) can split the natural language question into individual sentences, and further into smaller units, such as words or tokens. Tokenization (424) can convert each word or phrase of the segmented text into a standardized format suitable for processing. Part-of-speech tagging (426) can assign each token to a part-of-speech tag, such as noun, verb, or adjective, which provides grammatical information about the word's role in the sentence. If a token or phrase has multiple potential meanings, entity disambiguation (428) can resolve the ambiguity and determines the most likely meaning based on the context. Recognized entity detection (430) and identity pre-defined entities, such as dates, times, or monetary values, and classify these entities based on, for example, regular expressions or machine learning models. Relation extraction (432) can determine the relationships between extracted entities, such as identifying the subject, object, and predicate in a sentence. Finally, entity extraction (434) can consolidate the extracted entities, their attributes, and relationships into a structured format that can be used by downstream components.

In some implementations, flow-level tuning stage (408) can manage the conversation flow, generating prompts for the generative AI model (404), and incorporating the extracted entities and conversation context into the generated responses. The conversation management block (436) can keep track of the conversation state, maintain the dialog history, and determines the appropriate actions to take based on the natural language question and the decisioning system contracts (402).

In some implementations, flow-specific prompts (438) and flow-related persona instructions/prompts (440) can be used to guide the generative AI model (404) in producing responses that are tailored to the current conversation flow and align with the desired persona or tone of the conversational agent. These prompts can include templates, examples, or constraints that steer the model towards generating contextually relevant and coherent responses. Conversation sample (442) serves as a reference or benchmark for the generative AI model (404), providing examples of high-quality, engaging, and informative conversations. By conditioning the generative AI model (404) on these samples during the fine-tuning process and reinforcement learning process (described later), generative AI model (404) can learn to generate responses that emulate the style, tone, and content of the reference conversations.

In some implementations, semantic and syntactic parser (410) can validate the generated response to ensure its coherence, relevance, and grammatical correctness. The parser can analyze the structure and meaning of the response, checking for logical consistency, topic adherence, and alignment with the user's intent. It can employ techniques such as dependency parsing, semantic role labeling, and coreference resolution to assess the quality and appropriateness of the generated text. If the response fails the validation criteria, it can be sent back to the generative AI model (404) for refinement or regeneration.

The output of the semantic and syntactic parser (410) can represent the final, validated response that can be presented to the user. This response incorporates the extracted entities, follows the conversation flow defined by the decisioning system contracts, and maintains a high level of linguistic quality and coherence. The decisioning system contracts aid in shaping the conversational experience and ensuring that the generated responses align with the organization's business processes and objectives. These contracts act as a guiding framework for the conversational AI system, providing a clear structure and logic for handling different user intents and scenarios.

The contracts define the various steps and decision points in the conversation flow, specifying the input parameters, conditions, and output actions for each step. The conversational AI system can leverage these contracts to navigate through the conversation, gathering necessary information from the user, making decisions based on predefined rules, and executing appropriate actions or transactions.

For example, consider a scenario where a user wants to upgrade their mobile phone plan. The decisioning system contracts would define the entire upgrade process, including the eligibility criteria, available plans, pricing, and any promotional offers. The conversational AI system would follow the flow defined in the contracts, prompting the user for relevant information, such as their current plan, usage patterns, and preferences. Based on the user's responses and the business rules encoded in the contracts, the system would determine the best upgrade options and present them to the user in a clear and concise manner.

By adhering to the conversation flow and decision logic defined in the contracts, the conversational AI system ensures that the generated responses are contextually relevant, accurate, and consistent with the organization's policies and procedures. This adherence to the contracts also enables the system to handle complex, multi-turn interactions gracefully, maintaining a natural and coherent conversation flow throughout the user's journey.

As mentioned, the generated response can be further processed by the sentiment-based response generator to ensure it aligns with the desired emotional tone and user sentiment. This additional layer of processing enhances the user experience by adapting the response to the user's emotional state and providing a more empathetic and personalized interaction.

FIG. 5 is a block diagram illustrating an informational and frequently asked question (FAQ) response generation sub-system according to some of the disclosed embodiments.

In the illustrated sub-system, a retrieval-augmented generative AI model (504) is illustrated. In some implementations, retrieval-augmented generative AI model (504) can receive a natural language question (502) and provide an informational response (508) that answers the question. In some implementations, the natural language question (502) can comprise a question answerable via static text optionally coupled with user context data. For example, a question "how many vacation days do I have left" can combine static text (e.g., a policy) with user-specific data (e.g., employment level, days taken to date, etc.).

In the illustrated retrieval-augmented generative AI model (504), external data sources are used to augment generative AI capabilities. For example, a document datasource (512) and web data source (510) are used as sources of static content. Further, customer dynamic data (506) is used as context data for the user that issued the natural language question (502). During operation, the retrieval-augmented generative AI model (504) employ a retrieval step (514) which retrieves the most relevant static text based on performing a vectorized search of document datasource (512) and web data source (510) using the natural language question (502). For example, a similarity search can be performed. Next, in generation block (516) the most relevant documents as well as the customer dynamic data (506) can be used to synthesize a response using a large language model or other generative AI model.

In some implementations, document datasource (512) and web data source (510) serve as sources of static content for the retrieval-augmented generative AI model (504). These data sources can contain a collection of informational content, such as company policies, product manuals, FAQs, knowledge base articles, and website content. The document datasource (512) can include structured or semi-structured documents, such as portable document format (PDF) documents, word processing documents, database data or XML files, which are organized and indexed for efficient retrieval. The web data source (510) can include a wide range of web pages, blogs, forums, and other online resources that can provide relevant information to answer user queries. The content in these data sources can be preprocessed and transformed into a suitable format for retrieval and generation tasks. This can involve techniques like text cleaning, tokenization, named entity recognition, and document embedding. Each document or web page can be represented as a high-dimensional vector in a continuous space, capturing its semantic meaning.

In some implementations, customer dynamic data (506) represents the user-specific context data that is relevant to the natural language question (502). This data can include information such as the user's profile, preferences, purchase history, interaction logs, and any other data that can help personalize and contextualize the generated response. The customer dynamic data can be retrieved from various sources, such as customer relationship management (CRM) systems, user databases, or real-time data streams.

By incorporating customer dynamic data into the retrieval-augmented generative AI model (504), the sub-system can generate responses that are tailored to the individual user's needs, taking into account their specific circumstances, history, and context. This enables the system to provide more accurate, relevant, and personalized answers to user queries.

The retrieval step (514) can include finding the most relevant documents or passages from the document datasource (512) and web data source (510) based on the natural language question (502). The retrieval process can utilize the vectorized representations of the question and the documents to perform efficient similarity search. For example, retrieval step (514) can use a dense retrieval model, such as DPR (Dense Passage Retriever) or REALM (Retrieval-Augmented Language Model). These models encode the question and documents into dense vectors using transformer-based architectures and pre-trained language models. The similarity between the question vector and document vectors is computed using a metric like cosine similarity or dot product, and the top-k most similar documents are retrieved. The retrieval step can also employ techniques like term frequency-inverse document frequency (TF-IDF) weighting, BM25 scoring, or inverted indexing to speed up the search process and improve the relevance of the retrieved documents. The retrieved documents can then be passed on to the generation block (516) for further processing and response synthesis.

The generation block (516) is responsible for synthesizing the final response (508) to the natural language question (502) using the retrieved documents from the retrieval step (514) and the customer dynamic data (506). This block can use generative AI models, such as large language models (LLMs) or sequence-to-sequence models, to generate fluent, coherent, and informative responses. The retrieved documents can provide the relevant context and information needed to answer the question, while the customer dynamic data can aid in personalizing the response to the specific user. The generative AI model takes these inputs and generates a natural language response that incorporates the key information from the retrieved documents and adapts it to the user's context. The generation block (516) may involve techniques like extractive summarization, where the most relevant passages from the retrieved documents are extracted and concatenated to form the response. It may also employ abstractive summarization, where the model generates a novel response that captures the essence of the retrieved information while maintaining coherence and fluency. In some implementations, the generative AI model can be pre-trained on a large corpus of text data and fine-tuned on domain-specific datasets to improve its performance on the target task. During the generation process, the model uses attention mechanisms to focus on the most relevant parts of the input and generate contextually appropriate responses.

As illustrated, generated response (508) is the output of the retrieval-augmented generative AI model (504). It can provide a comprehensive, accurate, and personalized answer to the user's question, combining the static information from the document and web sources with the dynamic context of the customer. The response can then be returned to the user through the appropriate interface or channel.

Figure 6:
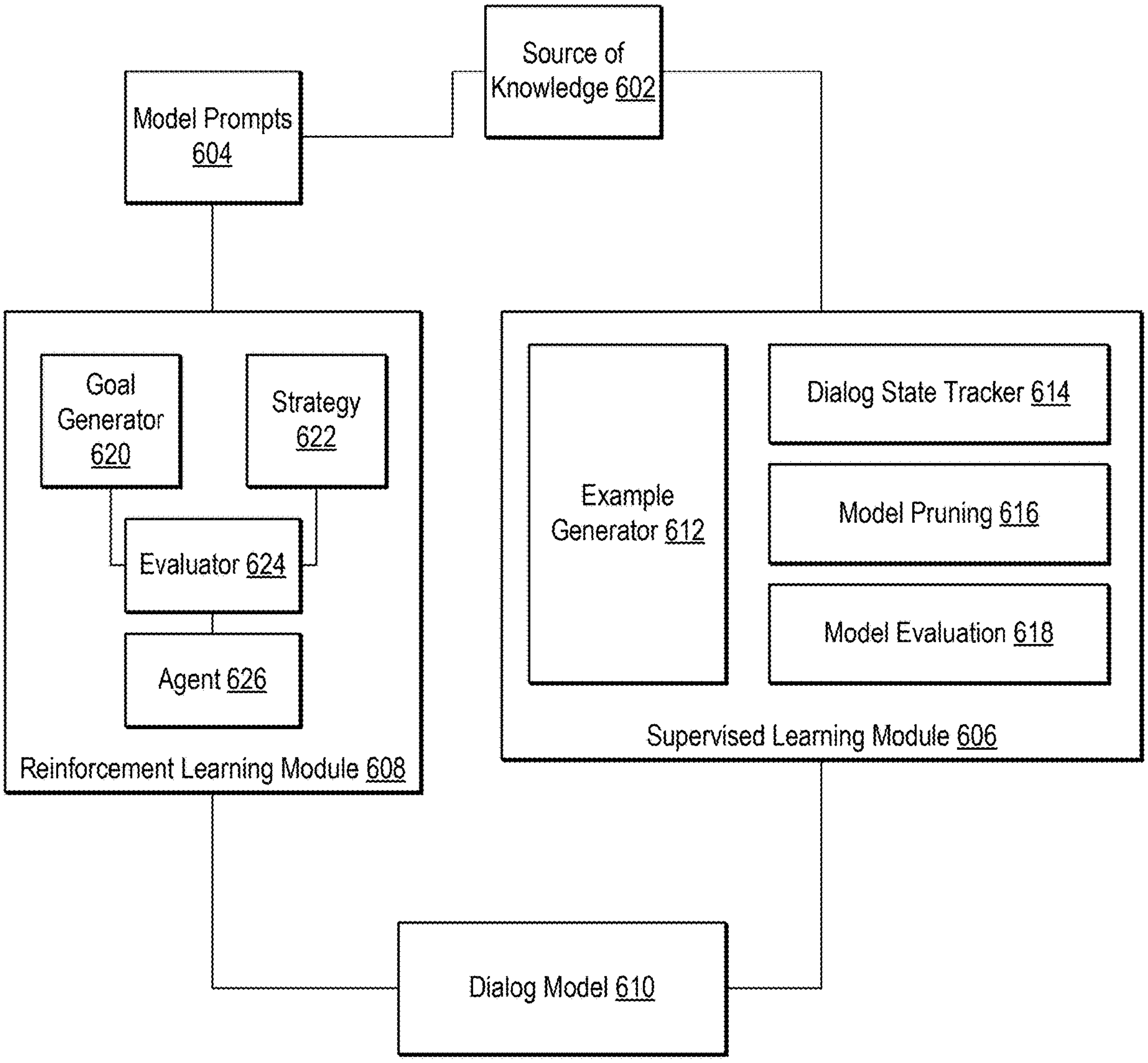
FIG. 6 is a block diagram illustrating a reinforcement learning sub-system according to some of the disclosed embodiments.

FIG. 6 is a block diagram illustrating a reinforcement learning sub-system according to some of the disclosed embodiments.

The illustrated sub-system can be used to periodically or continuously improve the performance of the generative AI model of FIG. 4. As illustrated, the sub-system can utilize a source of knowledge (602) which can include data such as positive and/or negative chat logs, transcripts, transactions, etc. The sub-system includes two learning modules that can be executed in parallel or in the alternative.

First, a supervised learning module (606) can be used to train the model in a supervised manner. The supervised learning module (606) can include an example generator (612) that can generate labeled chat examples using a large language model. In some implementations, these examples can be derived from the source of knowledge (602) and synthesized using an LLM. The supervised learning module (606) can further include a dialog state tracker (614) which can manage the state of a given chat log, transcript, etc. used from source of knowledge (602) to ensure the proper flow of conversation from the source of truth. The supervised learning module (606) can also include a model pruning stage (616) which reduces unused or extraneous aspects of the model as it is being trained. Finally, the supervised learning module (606) can include a model evaluation phase (618) to evaluate the effectiveness of the model relative to, for example, the current iteration of the model.

Second, a reinforcement learning module (608) can further be used to fine-tune the model. In reinforcement learning module (608), model prompts (604) may be generated from the source of knowledge (602). These model prompts (604) can then be fed to the reinforcement learning module (608) as input data. The reinforcement learning module (608) includes a goal generator (620) to generate specific goals or objectives based on the incoming prompts and strategy module (622) to determine actions or decisions the agent should take to achieve the goals. The reinforcement learning module (608) further includes an evaluator (624) that assesses the performance of the agent's actions in relation to the defined goals. It provides feedback or rewards based on how well the agent's actions align with the desired outcomes. Finally, the reinforcement learning module (608) includes an agent (626) that interacts with the environment (in this case, the dialog system). It takes actions based on the strategy and receives feedback or rewards from the evaluator.

The training outcomes of both supervised learning module (606) and reinforcement learning module (608) can be combined and used to update a dialog model (610) via fine-tuning.

In some implementations, source of knowledge (602) serves as the foundation for the reinforcement learning sub-system. It can store a collection of data, including positive and negative chat logs, transcripts, and transaction records. This data represents real-world interactions between users and the conversational AI system, capturing both successful and unsuccessful conversations. In some implementations, source of knowledge (602) is continuously updated with new data as the conversational AI system interacts with users, allowing for ongoing improvement and adaptation.

In some implementations, supervised learning module (606) is responsible for training the generative AI model using labeled examples generated from the source of knowledge (602). Example generator (612) can use LLMs to create labeled chat examples based on the data from the source of knowledge. It takes into account the structure, style, and content of the real-world conversations and generates synthetic examples that mimic those patterns. The generated examples can be annotated with appropriate labels, such as user intent, entity types, and desired system actions, to facilitate supervised learning. Dialog state tracker (614) can maintain the coherence and consistency of the generated examples. Specifically, it can keep track of the conversation flow, ensuring that the examples follow a logical sequence and maintain the proper context. The dialog state tracker aids in creating realistic multi-turn conversations that mimic real-world interactions. Model pruning stage (616) can optimize the generative AI model by removing unnecessary or redundant components. It identifies and eliminates model parameters that have little impact on the model's performance, reducing computational complexity and improving efficiency. Pruning techniques like magnitude-based pruning or lottery ticket hypothesis can be applied to achieve a more compact and efficient model. Finally, model evaluation phase (618) can assess the performance of the trained model against predefined evaluation metrics. It can compare the model's outputs with the ground truth labels from the source of knowledge, measuring aspects like accuracy, precision, recall, F1 score, etc.

Reinforcement learning module (608) can complement the supervised learning approach by fine-tuning the generative AI model through interaction with a simulated environment. It allows the model to learn optimal strategies and adapt its behavior based on feedback and rewards. Model prompts (604) serve as the input data for the reinforcement learning process. These prompts can be generated from the source of knowledge (602) and provide the initial context and goals for the learning agent. The prompts can be in the form of user queries, incomplete conversations, or specific objectives that the agent needs to achieve. In some implementations, model prompts (604) can be automatically generated using an LLM.

The goal generator (620) can analyze the input prompts and generates specific goals or objectives for the reinforcement learning agent. These goals can define the desired outcomes or milestones that the agent should strive for during the conversation. For example, goals can be related to providing accurate information, resolving user issues, or completing a specific task. Strategy module (622) can then determine the actions or decisions the agent should take to achieve the generated goals. It can define the policy or behavior that the agent follows in response to different states or situations encountered during the conversation. The strategy module learns and adapts its policy based on the feedback and rewards received from the evaluator (624). Evaluator (624) assesses the performance of the agent's actions in relation to the defined goals. It can provide feedback or rewards to the agent based on how well its actions align with the desired outcomes. Evaluator (624) can consider various factors, such as user satisfaction, task completion, and conversation quality, to determine the appropriate rewards or penalties. Agent (626) can interact with the simulated dialog environment, taking actions based on the learned strategy. The agent can receive feedback and rewards from the evaluator and updates its behavior accordingly. Through iterative interactions and learning, the agent can refine its decision-making process and improves its ability to generate appropriate responses and achieve the specified goals.

The fine-tuned dialog model resulting from the integration of supervised learning and reinforcement learning is continuously updated and improved based on new data and feedback. This iterative process allows the conversational AI system to adapt and evolve over time, providing better responses and more natural interactions with users.

Figure 7:
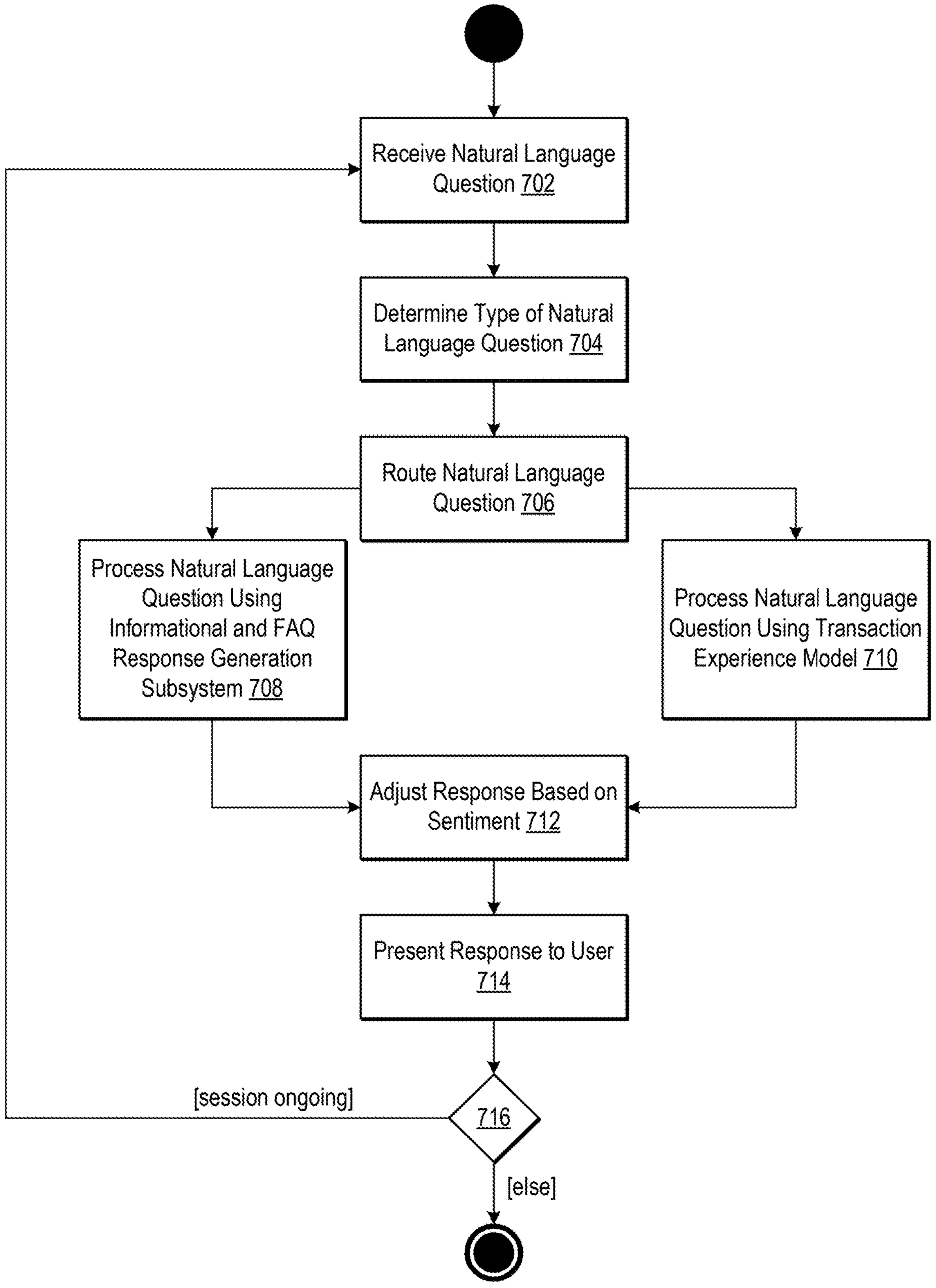
FIG. 7 is a flow diagram illustrating a method for processing a natural language question in a conversational AI system according to some of the disclosed embodiments.

FIG. 7 is a flow diagram illustrating a method for processing a natural language question in a conversational AI system according to some of the disclosed embodiments. Reference is made to FIG. 2 for further explanation of steps described herein.

In step 702, the method can include receiving a natural language question from a user. In some embodiments, the natural language question can be received via a chat interface, voice input, or any other suitable input mechanism.

In step 704, the method can include determining the type of the natural language question using a large language model (LLM). The LLM analyzes the content and context of the question to classify it as either a transactional question or an informational question. In some embodiments, the LLM can be fine-tuned on a domain-specific dataset to improve its classification accuracy.

In step 706, the method can include routing the natural language question based on its type. If the question is classified as an informational query, the method proceeds to step 708. If the question is classified as a transactional query, the method proceeds to step 710.

In step 708, the method can include processing the informational query using an informational and frequently asked question (FAQ) response generation subsystem. This subsystem retrieves relevant information from various data sources, such as documents, web pages, and FAQs, and generates a concise and accurate response to the user's question. The generated response is then passed to step 712.

In step 710, the method can include processing the transactional query using a transaction experience model. This model interacts with a decisioning system to access user-specific data and business rules, understands the user's intent, gathers necessary information, and generates a personalized response that guides the user through the transactional process. The generated response is then passed to step 712.

In step 712, the method can include analyzing the sentiment of the user's question and the overall conversation session using a sentiment-based response generator. This generator determines the emotional tone of the user's input and adjusts the generated response to provide a more empathetic and contextually appropriate response.

In step 714, the method can include presenting the sentiment-adjusted response to the user via the chat interface or any other suitable output mechanism. The response aims to provide accurate information, guide the user through transactional processes, and maintain a natural and engaging conversation flow.

In step 716, the method can include determining if the user has any additional questions or if the conversation session has concluded. If the user has more questions, the method returns to step 702 to receive the next natural language question. If the conversation has concluded or the user does not have further questions, the method ends.

Using the above-described method, the conversational AI system can effectively process and respond to a wide range of user questions, providing informational or transactional assistance while maintaining a human-like and empathetic conversation experience. Details of steps of the method of FIG. 7 are provided in the following flow diagrams.

Figure 8:
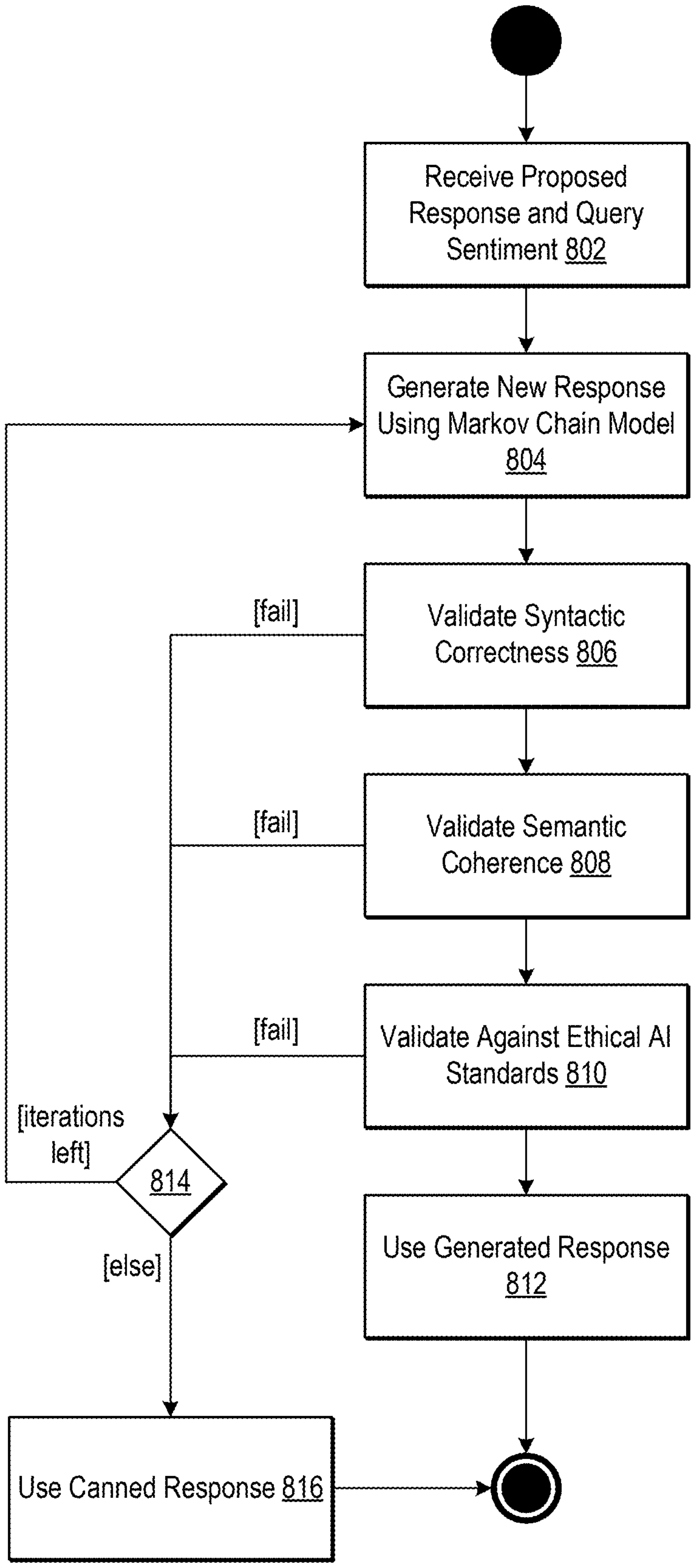
FIG. 8 is a flow diagram illustrating a method for generating a sentiment-aware response in a conversational AI system according to some of the disclosed embodiments.

FIG. 8 is a flow diagram illustrating a method for generating a sentiment-aware response in a conversational AI system according to some of the disclosed embodiments. Reference is made to FIG. 3 for further explanation of steps described herein.

In step 802, the method can include receiving a proposed response and a query sentiment as inputs. The proposed response can be sourced from various components within the conversational AI system, such as a pre-built dialog management system, a knowledge base, or a language generation model. The query sentiment represents the emotional tone or attitude expressed in the user's natural language question, which can be determined using sentiment analysis techniques.

In step 804, the method can include generating a new response based on the proposed response and the query sentiment using an empathy-driven NLG model. The empathy-driven NLG model learns the transition probabilities between words or phrases in a response based on their co-occurrence patterns in a large corpus of conversational data. It also incorporates the query sentiment information to adjust the response generation process, favoring words and phrases that are more aligned with the desired sentiment.

In step 806, the method can include validating the syntactic correctness of the generated response using a syntactic parser. The syntactic parser analyzes the grammatical structure of the response, checking for agreement between subject and verb, proper use of articles and prepositions, and adherence to the rules of the underlying grammar. If the generated response fails the syntactic validation, the method proceeds to step 814. If the response passes the syntactic validation, the method proceeds to step 808.

In step 808, the method can include validating the semantic coherence of the generated response using a semantic parser. The semantic parser analyzes the meaning and logical consistency of the response, ensuring that it is relevant to the user's query, maintains a coherent flow of information, and aligns with the intended message or goal of the conversation. If the generated response fails the semantic validation, the method proceeds to step 814. If the response passes the semantic validation, the method proceeds to step 810.

In step 810, the method can include checking the generated response against ethical AI standards. This step ensures that the response adheres to predefined ethical guidelines and avoids any inappropriate, offensive, or biased content. If the generated response fails the ethical AI check, the method proceeds to step 814. If the response passes the ethical AI check, the method proceeds to step 812.

In step 812, the method can include using the generated response as the final sentiment-aware response. The response is then ready to be delivered to the user through the appropriate output channel.

In step 814, the method can include checking if the maximum number of iterations through the empathy-driven NLG model has been reached. If the maximum number of iterations has not been reached, the method returns to step 804 to generate a new response using the empathy-driven NLG model. If the maximum number of iterations has been reached, the method proceeds to step 816.

In step 816, the method can include using a default or canned response as the final response. This step ensures that the system provides a response to the user even if it is unable to generate a sentiment-aware response that passes all the validation checks within the allocated number of iterations.

Using the above-described method, the conversational AI system can generate sentiment-aware responses that are syntactically correct, semantically coherent, and ethically sound. The sentiment-based response generator enhances the user experience by providing more empathetic and contextually appropriate responses, while maintaining the integrity and trustworthiness of the system.

Figure 9:
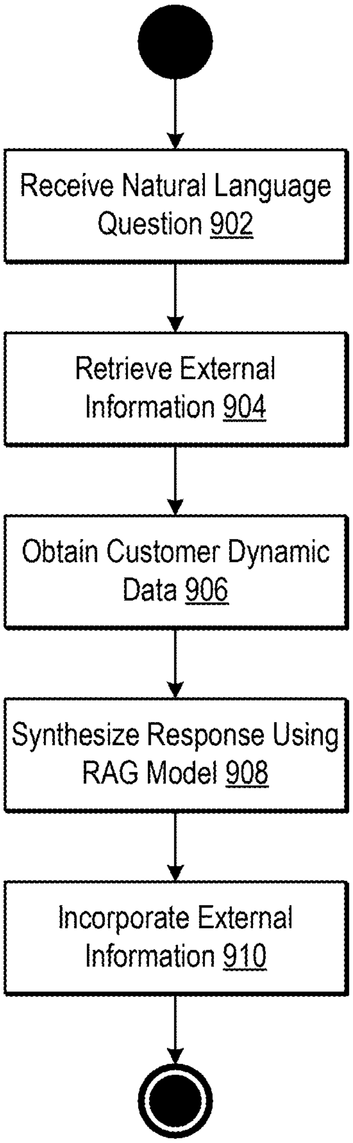
FIG. 9 is a flow diagram illustrating a method for generating an informational response using a retrieval-augmented generative AI model according to some of the disclosed embodiments.

FIG. 9 is a flow diagram illustrating a method for generating an informational response using a retrieval-augmented generative AI model according to some of the disclosed embodiments. Reference is made to FIG. 4 for further explanation of steps described herein.

In step 902, the method can include receiving a natural language question from a user. The natural language question represents a user's query or request for information that can be answered using static text coupled with user-specific context data.

In step 904, the method can include retrieving relevant information from a document data source and a web data source based on the natural language question. This step involves performing a vectorized search of the document data source and web data source using the natural language question to find the most relevant static text. Techniques such as similarity search or dense vector retrieval can be employed to efficiently retrieve the most relevant documents or passages.

In step 906, the method can include obtaining customer dynamic data associated with the user who asked the natural language question. The customer dynamic data represents user-specific context data that can be used to personalize and contextualize the generated response. This data may include information such as the user's profile, preferences, purchase history, or interaction logs.

In step 908, the method can include synthesizing a response using a retrieval-augmented generative AI model. The model takes the retrieved static text from the document and web data sources, along with the customer dynamic data, as inputs to generate an informative and contextualized response. The generative AI model, which can be a large language model or a sequence-to-sequence model, is trained to generate fluent, coherent, and relevant responses based on the input data.

In step 910, the method can include incorporating the retrieved information and customer dynamic data into the generated response. This step ensures that the response includes the most relevant information from the static text sources while being tailored to the specific user's context and needs. The model may employ techniques such as extractive or abstractive summarization to effectively combine the retrieved information into a concise and informative response.

Using the above-described method, the conversational AI system can generate informative and personalized responses to user queries using a retrieval-augmented generative AI model. The combination of retrieved static text, customer dynamic data, and the generative capabilities of the AI model enables the system to provide accurate, relevant, and context-aware information to users efficiently.

Figure 10:
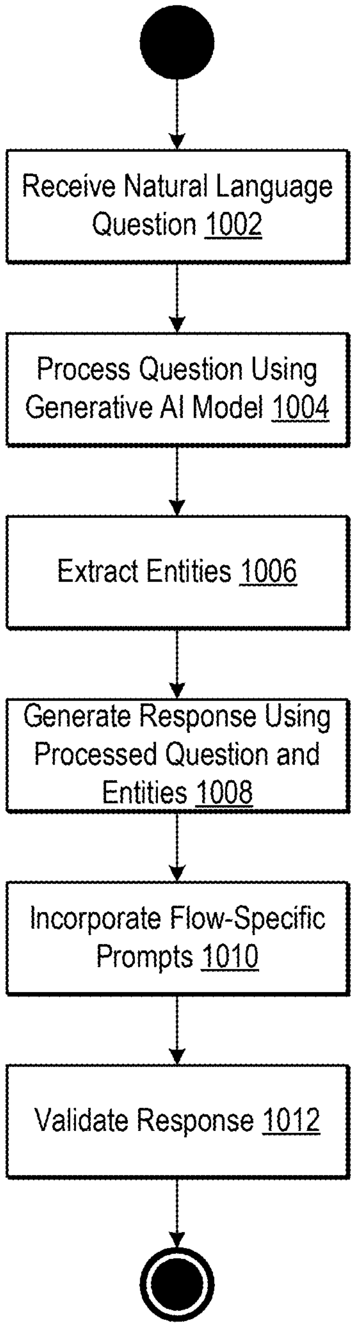
FIG. 10 is a flow diagram illustrating a method for generating a transaction-based response in a conversational AI system according to some of the disclosed embodiments.

FIG. 10 is a flow diagram illustrating a method for generating a transaction-based response in a conversational AI system according to some of the disclosed embodiments. Reference is made to FIG. 4 for further explanation of steps described herein.

In step 1002, the method can include receiving a natural language question as input. The natural language question represents a user's query or request related to a specific transaction or action within the system.

In step 1004, the method can include processing the natural language question using a generative AI model. The generative AI model is trained to understand user intents, generate appropriate responses, and guide the conversational flow based on the input question and the decisioning system contracts.

In some implementations, this step can include embedding the input text using an embedding layer. The embedding layer converts the natural language question into dense vector representations that capture the semantic meaning of words and phrases, enabling the model to process and reason about the input effectively. In some implementations, this step can include processing the embedded input using one or more transformer encoders. Each transformer encoder layer consists of a multi-head attention mechanism and a feed-forward network (FFN). The multi-head attention allows the model to attend to different parts of the input sequence simultaneously, capturing complex relationships and dependencies. The FFN applies non-linear transformations to the attended features, enabling the model to learn high-level representations.

In step 1006, the method can include extracting relevant entities from the natural language question using an NLP entity extractor block. The entity extraction process involves several sub-steps, such as sentence extraction, segmentation, tokenization, part-of-speech tagging, entity disambiguation, recognized entity detection, relation extraction, and entity extraction. These steps identify and extract key information, such as names, dates, locations, or products, that helps in understanding the user's intent and guiding the conversation.

In step 1008, the method can include generating a response using the output of the generative AI model and the extracted entities. The response is generated based on the conversation flow defined by the decisioning system contracts and is tailored to the current context and the user's intent.

In step 1010, the method can include incorporating flow-specific prompts and persona instructions into the generated response. These prompts and instructions guide the generative AI model in producing responses that align with the desired conversation flow, tone, and persona of the conversational agent.

In step 1012, the method can include validating the generated response using a semantic and syntactic parser. The parser analyzes the structure and meaning of the response, checking for coherence, relevance, and grammatical correctness.

Using the above-described method, the conversational AI system can generate transaction-based responses that are tailored to the user's intent, aligned with the organization's business rules, and maintain a natural and coherent conversation flow. The combination of the generative AI model, entity extraction, flow-level tuning, and semantic and syntactic validation ensures that the responses are accurate, relevant, and linguistically sound, providing a seamless and effective user experience.

Figure 11:
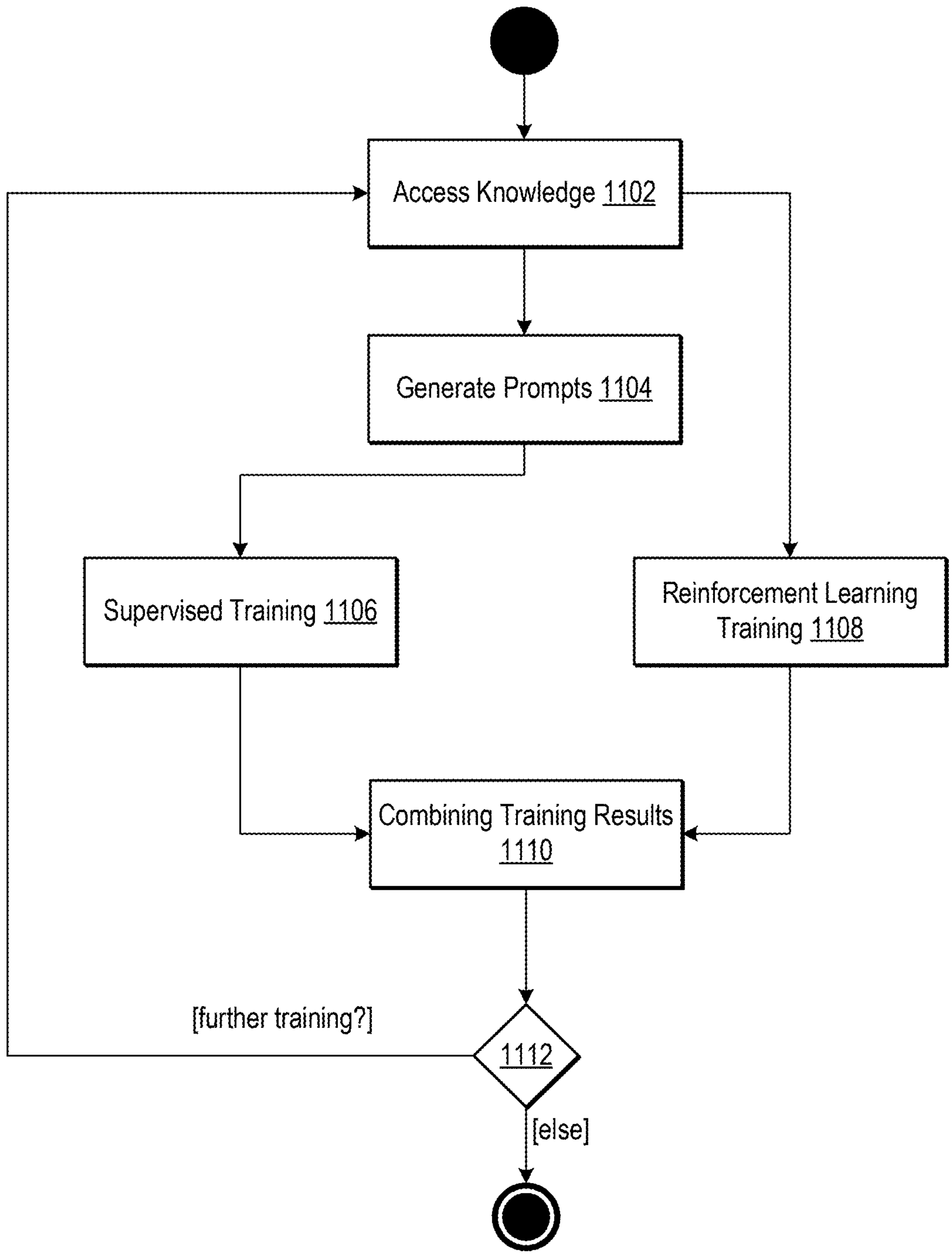
FIG. 11 is a flow diagram illustrating a method for reinforcement learning in a conversational AI system according to some of the disclosed embodiments.

FIG. 11 is a flow diagram illustrating a method for reinforcement learning in a conversational AI system according to some of the disclosed embodiments. Reference is made to FIG. 5 for further explanation of steps described herein.

In step 1102, the method can include accessing a source of knowledge containing data such as chat logs, transcripts, and transaction records. This data represents real-world interactions between users and the conversational AI system, capturing both successful and unsuccessful conversations.

In step 1104, the method can include generating model prompts from the source of knowledge. These prompts serve as input data for the reinforcement learning process and can be in the form of user queries, incomplete conversations, or specific objectives that the learning agent needs to achieve.

In step 1106, the method can include training the generative AI model using a supervised learning approach. This step involves generating labeled chat examples from the source of knowledge using an example generator, which creates synthetic examples that mimic the structure, style, and content of real-world conversations. The generated examples are annotated with appropriate labels to facilitate supervised learning. In some implementations, step 1106 can include managing the conversation flow and maintaining the coherence and consistency of the generated examples using a dialog state tracker. This ensures that the examples follow a logical sequence and maintain the proper context, creating realistic multi-turn conversations. In some implementations, step 1106 can include optimizing the generative AI model by removing unnecessary or redundant components using a model pruning stage. This step reduces computational complexity and improves the efficiency of the model. In some implementations, step 1106 can include assessing the performance of the trained model against predefined evaluation metrics using a model evaluation phase. This step compares the model's outputs with the ground truth labels from the source of knowledge, measuring aspects like accuracy, precision, recall, and F1 score.

In step 1108, the method can include fine-tuning the generative AI model using a reinforcement learning approach. This step involves the learning agent interacting with a simulated dialog environment and adapting its behavior based on feedback and rewards. In some implementations, step 1108 can include generating specific goals or objectives for the reinforcement learning agent based on the input prompts using a goal generator. These goals define the desired outcomes or milestones that the agent should strive for during the conversation. In some implementations, step 1108 can include determining the actions or decisions the agent should take to achieve the generated goals using a strategy module. The strategy module defines the policy or behavior that the agent follows in response to different states or situations encountered during the conversation. In some implementations, step 1108 can include assessing the performance of the agent's actions in relation to the defined goals using an evaluator. The evaluator provides feedback or rewards to the agent based on how well its actions align with the desired outcomes, considering factors such as user satisfaction, task completion, and conversation quality. In some implementations, step 1108 can include updating the agent's behavior based on the feedback and rewards received from the evaluator. The agent interacts with the simulated dialog environment, taking actions based on the learned strategy, and refines its decision-making process through iterative interactions and learning.

In step 1110, the method can include combining the training outcomes of both the supervised learning approach and the reinforcement learning approach to update the dialog model via fine-tuning. This iterative process allows the conversational AI system to adapt and evolve over time, providing better responses and more natural interactions with users.

In step 1112, the method can include determining if further training is required based on predefined criteria, such as model performance metrics or the availability of new data in the source of knowledge. If further training is needed, the method returns to step 1102 to continue the learning process. If the model has reached satisfactory performance levels or no new data is available, the method ends.

Using the above-described method, the conversational AI system can leverage both supervised learning and reinforcement learning techniques to continuously improve its performance and adapt to new data and user interactions. The combination of these learning approaches enables the system to generate more accurate, coherent, and contextually relevant responses, enhancing the overall user experience.

Figure 12:
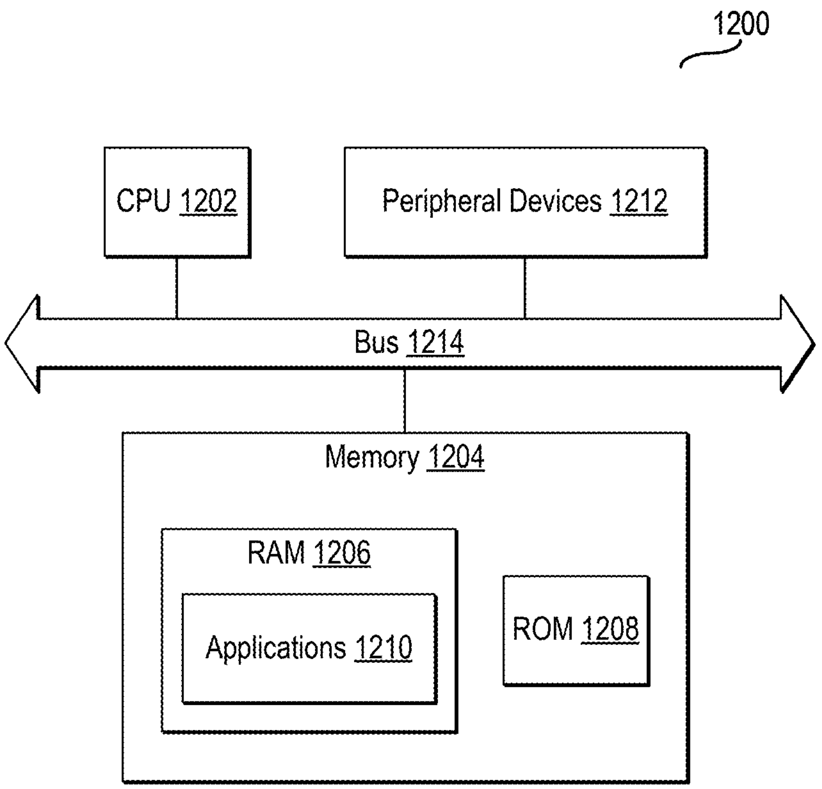
FIG. 12 is a block diagram of a computing device according to some embodiments of the disclosure.

FIG. 12 is a block diagram of a computing device according to some embodiments of the disclosure.

As illustrated, the device (1200) includes a processor or central processing unit (CPU) such as CPU (1202) in communication with a memory (1204) via a bus (1214). The device also includes one or more input/output (I/O) or peripheral devices (1212). Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU (1202) may comprise a general-purpose CPU. The CPU (1202) may comprise a single-core or multiple-core CPU. The CPU (1202) may comprise a system-on-a-chip (SoC) or a similar embedded system. In some embodiments, a graphics processing unit (GPU) may be used in place of, or in combination with, a CPU (1202). Memory (1204) may comprise a memory system including a dynamic random-access memory (DRAM), static random-access memory (SRAM), Flash (e.g., NAND Flash), or combinations thereof. In one embodiment, the bus (1214) may comprise a Peripheral Component Interconnect Express (PCIe) bus. In some embodiments, the bus (1214) may comprise multiple busses instead of a single bus.

Memory (1204) illustrates an example of a non-transitory computer storage media for the storage of information such as computer-readable instructions, data structures, program modules, or other data. Memory (1204) can store a basic input/output system (BIOS) in read-only memory (ROM), such as ROM (1208) for controlling the low-level operation of the device. The memory can also store an operating system in random-access memory (RAM) for controlling the operation of the device.

Applications (1210) may include computer-executable instructions which, when executed by the device, perform any of the methods (or portions of the methods) described previously in the description of the preceding figures. In some embodiments, the software or programs implementing the method embodiments can be read from a hard disk drive (not illustrated) and temporarily stored in RAM (1206) by CPU (1202). CPU (1202) may then read the software or data from RAM (1206), process them, and store them in RAM (1206) again.

The device may optionally communicate with a base station (not shown) or directly with another computing device. One or more network interfaces in peripheral devices (1212) are sometimes referred to as a transceiver, transceiving device, or network interface card (NIC).

An audio interface in peripheral devices (1212) produces and receives audio signals such as the sound of a human voice. For example, an audio interface may be coupled to a speaker and microphone (not shown) to enable telecommunication with others or generate an audio acknowledgment for some action. Displays in peripheral devices (1212) may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices (1212) may comprise any input device arranged to receive input from a user. An illuminator in peripheral devices (1212) may provide a status indication or provide light. The device can also comprise an input/output interface in peripheral devices (1212) for communication with external devices, using communication technologies, such as USB, infrared, Bluetooth®, or the like. A haptic interface in peripheral devices (1212) provides tactile feedback to a user of the client device.

A GPS receiver in peripheral devices (1212) can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The preceding detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can in fact be executed substantially concurrently or the blocks can sometimes be executed in the reverse order, depending upon the functionality or acts involved.

We claim:

1. A method comprising:

receiving a natural language question from a user;

determining, using a large language model, whether the natural language question is a transactional question or an informational question;

generating, using a first generative artificial intelligence (AI) model, a first response to the natural language question when the natural language question is an informational question;

generating, using a transaction generative AI model that interfaces with a decisioning system based on contracts of the decisioning system, a second response to the natural language question when the natural language question is a transactional question, wherein the decisioning system contracts define business logic, rules, and decision-making processes for handling transactional requests;

generating, using a sentiment-based response generator, a third response based on one of the first response or the second response and a sentiment of the natural language question;

presenting the third response to the user-; and training the transaction generative AI model using a reinforcement learning approach based on a source of knowledge containing chat logs, transcripts, and transaction records, the reinforcement learning approach including providing model prompts generated from the source of knowledge to a reinforcement learning agent, and updating a behavior of the reinforcement learning agent based on feedback from an evaluator that assesses actions of the reinforcement learning agent.

2. The method of claim 1, wherein generating the third response using the sentiment-based response generator comprises:

receiving the third response and a query sentiment of the natural language question;

generating a new response based on the third response and the query sentiment using an empathy-driven natural language generation model;

validating a syntactic correctness of the new response using a syntactic parser;

validating a semantic coherence of the new response using a semantic parser; and using the new response as the third response if the syntactic correctness and semantic coherence are valid.

3. The method of claim 1, wherein generating the second response using the transaction generative AI model comprises:

processing the natural language question using a generative AI model;

extracting entities from the natural language question using natural language processing (NLP) entity extraction;

generating the second response using an output of the generative AI model and the entities;

incorporating flow-specific prompts and persona instructions into the second response; and validating the second response using a semantic and syntactic parser.

4. The method of claim 3, wherein the generative AI model comprises:

an embedding layer that converts input text into dense vector representations;

one or more transformer encoders, each including a multi-head attention mechanism and a feed-forward network; and an output embedding layer.

5. The method of claim 1, wherein generating the first response using the first generative AI model comprises:

retrieving relevant information from a document data source and a web data source based on the natural language question using a retrieval step; and synthesizing the first response using a retrieval-augmented generative AI model based on the retrieved information and customer dynamic data.

6. The method of claim 1, wherein training the transaction generative AI model further comprises training the transaction generative AI model using a supervised learning approach based on the source of knowledge, and updating the transaction generative AI model based on the training.

7. The method of claim 6, wherein the reinforcement learning approach comprises:

generating model prompts from the source of knowledge;

generating goals for a reinforcement learning agent based on the model prompts using a goal generator;

determining actions for the reinforcement learning agent to achieve the goals using a strategy module;

assessing a performance of the actions using an evaluator; and updating a behavior of the reinforcement learning agent based on feedback and rewards from the evaluator.

8. A non-transitory computer-readable storage medium for tangibly storing computer program instructions capable of being executed by a computer processor, the computer program instructions defining steps of:

receiving a natural language question from a user;

determining, using a large language model, whether the natural language question is a transactional question or an informational question;

generating, using a first generative artificial intelligence (AI) model, a first response to the natural language question when the natural language question is an informational question;

generating, using a transaction generative AI model that interfaces with a decisioning system based on contracts of the decisioning system, a second response to the natural language question when the natural language question is a transactional question, wherein the decisioning system contracts define business logic, rules, and decision-making processes for handling transactional requests;

generating, using a sentiment-based response generator, a third response based on one of the first response or the second response and a sentiment of the natural language question;

presenting the third response to the user; and training the transaction generative AI model using a reinforcement learning approach based on a source of knowledge containing chat logs, transcripts, and transaction records, the reinforcement learning approach including providing model prompts generated from the source of knowledge to a reinforcement learning agent, and updating a behavior of the reinforcement learning agent based on feedback from an evaluator that assesses actions of the reinforcement learning agent.

9. The non-transitory computer-readable storage medium of claim 8, wherein generating the third response using the sentiment-based response generator comprises:

receiving the third response and a query sentiment of the natural language question;

generating a new response based on the third response and the query sentiment using an empathy-driven natural language generation model;

validating a syntactic correctness of the new response using a syntactic parser;

validating a semantic coherence of the new response using a semantic parser; and using the new response as the third response if the syntactic correctness and semantic coherence are valid.

10. The non-transitory computer-readable storage medium of claim 8, wherein generating the second response using the transaction generative AI model comprises:

processing the natural language question using a generative AI model;

extracting entities from the natural language question using natural language processing (NLP) entity extraction;

generating the second response using an output of the generative AI model and the entities;

incorporating flow-specific prompts and persona instructions into the second response; and validating the second response using a semantic and syntactic parser.

11. The non-transitory computer-readable storage medium of claim 10, wherein the generative AI model comprises:

an embedding layer that converts input text into dense vector representations;

one or more transformer encoders, each including a multi-head attention mechanism and a feed-forward network; and an output embedding layer.

12. The non-transitory computer-readable storage medium of claim 8, wherein generating the first response using the first generative AI model comprises:

retrieving relevant information from a document data source and a web data source based on the natural language question using a retrieval step; and synthesizing the first response using a retrieval-augmented generative AI model based on the retrieved information and customer dynamic data.

13. The non-transitory computer-readable storage medium of claim 8, wherein training the transaction generative AI model further comprises training the transaction generative AI model using a supervised learning approach based on the source of knowledge, and updating the transaction generative AI model based on the training.

14. The non-transitory computer-readable storage medium of claim 13, wherein the reinforcement learning approach comprises:

generating model prompts from the source of knowledge;

generating goals for a reinforcement learning agent based on the model prompts using a goal generator;

determining actions for the reinforcement learning agent to achieve the goals using a strategy module;

assessing a performance of the actions using an evaluator; and updating a behavior of the reinforcement learning agent based on feedback and rewards from the evaluator.

15. A device comprising:

a processor; and a storage medium for tangibly storing thereon program logic for execution by the processor, the program logic comprising:

logic, executed by the processor, for receiving a natural language question from a user;

logic, executed by the processor, for determining, using a large language model, whether the natural language question is a transactional question or an informational question;

logic, executed by the processor, for generating, using a first generative artificial intelligence (AI) model, a first response to the natural language question when the natural language question is an informational question;

logic, executed by the processor, for generating, using a transaction generative AI model that interfaces with a decisioning system based on contracts of the decisioning system, a second response to the natural language question when the natural language question is a transactional question, wherein the decisioning system contracts define business logic, rules, and decision-making processes for handling transactional requests;

logic, executed by the processor, for generating, using a sentiment-based response generator, a third response based on one of the first response or the second response and a sentiment of the natural language question;

logic, executed by the processor, for presenting the third response to the user; and logic, executed by the processor, for training the transaction generative AI model using a reinforcement learning approach based on a source of knowledge containing chat logs, transcripts, and transaction records, the reinforcement learning approach including providing model prompts generated from the source of knowledge to a reinforcement learning agent, and updating a behavior of the reinforcement learning agent based on feedback from an evaluator that assesses actions of the reinforcement learning agent.

16. The device of claim 15, wherein generating the third response using the sentiment-based response generator comprises:

receiving the third response and a query sentiment of the natural language question;

generating a new response based on the third response and the query sentiment using an empathy-driven natural language generation model;

validating a syntactic correctness of the new response using a syntactic parser;

validating a semantic coherence of the new response using a semantic parser; and using the new response as the third response if the syntactic correctness and semantic coherence are valid.

17. The device of claim 15, wherein generating the second response using the transaction generative AI model comprises:

processing the natural language question using a generative AI model;

extracting entities from the natural language question using natural language processing (NLP) entity extraction;

generating the second response using an output of the generative AI model and the entities;

incorporating flow-specific prompts and persona instructions into the second response; and validating the second response using a semantic and syntactic parser.

18. The device of claim 17, wherein the generative AI model comprises:

an embedding layer that converts input text into dense vector representations;

one or more transformer encoders, each including a multi-head attention mechanism and a feed-forward network; and an output embedding layer.

19. The device of claim 15, wherein generating the first response using the first generative AI model comprises:

retrieving relevant information from a document data source and a web data source based on the natural language question using a retrieval step; and synthesizing the first response using a retrieval-augmented generative AI model based on the retrieved information and customer dynamic data.

20. The device of claim 15, wherein training the transaction generative AI model further comprises training the transaction generative AI model using a supervised learning approach based on the source of knowledge, and updating the transaction generative AI model based on the training.

* * * * *